(12) United States Patent
Cancedda (10) Patent No.: US 8,572,379 B2
(45) Date of Patent: Oct. 29, 2013

(54) PRIVATE ACCESS TO HASH TABLES

(75) Inventor: Nicola Cancedda, Grenoble (FR)

(73) Assignee: Xerox Corporation, Norwalk, CT (US)

(*) Notice: Subject to any disclaimer, the term of this patent is extended or adjusted under 35 U.S.C. 154(b) by 190 days.

(21) Appl. No.: 13/204,894

(22) Filed: Aug. 8, 2011

(65) Prior Publication Data

US 2013/0042108 A1   Feb. 14, 2013

(51) Int. Cl.
*H04L 9/32* (2006.01)

(52) U.S. Cl.
USPC ............... 713/168; 380/47; 380/28; 704/7; 713/165

(58) Field of Classification Search
USPC ............ 713/168, 195, 165; 380/47, 28; 704/7
See application file for complete search history.

(56) References Cited

U.S. PATENT DOCUMENTS 6,049,613 A * 4/2000 Jakobsson .................... 380/47
6,131,082 A * 10/2000 Hargrave et al. ............ 704/7

OTHER PUBLICATIONS

Khayat et al. (2008). Using Commutative Encryption to Share a Secret. Retrieved Apr. 15, 2013 from http://eprint.iacr.org/2008/356.pdf.*
Ananthi et al. (Jul. 2011). Privacy Preserving Keyword Search over Encrypted Cloud Data. Springer-Verlag Berlin Heidelberg.*
Bao, et al. "An Efficient and Practical Scheme for Privacy Protection in the E-Commerce of Digital Goods", ICISC, 2000, Third International Conference, Dec. 8-9, 2000, pp. 162-170.
Bellovin, et al. "Privacy-Enhanced searches using encrypted bllo filters", Technical Report, CUCS-034-07, 2006, Columbia University, New York, pp. 1-16.
Goh. "Secure Indexes", Stanford University technical report, May 5, 2004, pp. 1-19.
Lindell, et al. "Secure Multiparty Computation for Privacy-Preserving Data Mining", The Journal of Privacy and Confidentiality, vol. 1, No. 1, May 6, 2008, pp. 1-39.
"Simple Commutative Encryption using RSA engine", 2008, http://www.antifraudlabs.com/presentations/pages/security_comm_RSA.aspx; Retrieved Jul. 21, 2011, pp. 1-2.

* cited by examiner

*Primary Examiner* — Brian Shaw
(74) *Attorney, Agent, or Firm* — Fay Sharpe LLP (57) ABSTRACT

A server and a client mutually exclusively execute server-side and client-side commutative cryptographic processes and server-side and client-side commutative permutation processes. The server has access to a hash table, while the client does not. The server and client perform a method including: encrypting and reordering the hash table using the server; communicating the encrypted and reordered hash table to the client; further encrypting and further reordering the hash table using the client; communicating the further encrypted and further reordered hash table back to the server; and partially decrypting and partially undoing the reordering using the server to generate a double-blind hash table. To read an entry, the client hashes and permute an index key and communicates same to the server which retrieves an item from the double-blind hash table using the hashed and permuted index key and sends it back to the client which decrypts the retrieved item.

15 Claims, 6 Drawing Sheets

SERVER — T

| cat | meows |
|---|---|
| dog | barks |
| lion | roars |
| elephant | bellows |
| donkey | brays |

→ (2) →

| dbu | nfpxt |
|---|---|
| eph | cbslt |
| mjpo | spbst |
| fmfqibou | cfmmpxt |
| epolfz | csbzt |

ALPHABET +1

→ (3) →

$T_1$

| fmfqibou | cfmmpxt |
|---|---|
| epolfz | csbzt |
| dbu | nfpxt |
| eph | cbslt |
| mjpo | spbst |

POSITION +2

CLIENT — $T_1$

| fmfqibou | cfmmpxt |
|---|---|
| epolfz | csbzt |
| dbu | nfpxt |
| eph | cbslt |
| mjpo | spbst |

→ (4) → (5) →

| hohskdqw | ehoorzv |
|---|---|
| grqnhb | eudbv |
| fdw' | phrzv |
| grj | edunv |
| olrq | urduv |

ALPHABET +2

→ (6) →

$T_{12}$

| olrq | urduv |
|---|---|
| hohskdqw | ehoorzv |
| grqnhb | eudbv |
| fdw | phrzv |
| grj | edunv |

POSITION +1

SERVER — $T_{12}$

| olrq | urduv |
|---|---|
| hohskdqw | ehoorzv |
| grqnhb | eudbv |
| fdw | phrzv |
| grj | edunv |

→ (7) → (8) →

| nkqp | tqctu |
|---|---|
| gngrjcpv | dgnnqyu |
| fqpmga | dtcau |
| ecv | ogqyu |
| fqi | dctlu |

ALPHABET -1

→ (9) →

$T_{BB}$

| fqmga | dtcau |
|---|---|
| ecv | ogqyu |
| fqi | dclu |
| nkqp | tqctu |
| gngrjcpv | dgnnqyu |

POSITION -2

PRIVATE ACCESS TO HASH TABLES

BACKGROUND

The following relates to secure information storage, access, and processing arts, and to related arts, and to applications of same.

In some database applications, one party (e.g., a "client") may seek access to information contained in a database controlled by another party (e.g., a "server") but under highly secure conditions. The client may not want to (or may be legally bound not to) disclose the nature of the information sought. In such cases the server may be willing to provide this information in a "blind" fashion, that is, without knowing what information was sent to the client. But, the server is likely to want to be able to track the quantity of delivered information, for example in order to charge for its delivery, or in order to maintain usage statistics justifying the continued maintenance of the database. The server may also want to prevent inadvertent disclosure of items that were not requested by the client, and/or the client may want to ensure that the received information is actually the information that the client requested. The server may not want to publish the database in its entirety (or even in sizable part), as the database may comprise confidential information whose publication might result in loss of trade secret rights, loss of copyright rights, or forfeiture of other intellectual property rights.

The security requirements for such applications may be summarized as follows: (1) The Server does not learn which item is retrieved by the client; (2) The Server does not learn the item index searched by the client; (3) The Server does receive a count of the number of retrieved items; and (4) The Client does not learn the content of any items whose retrieval is not counted by the Server.

Examples of applications that would benefit from such a highly secure retrieval protocol include various natural language translation resources. For example, a translation memory (TM) is a natural language translation resource in which source-language text is stored together with corresponding translated target-language text. By way of specific example, a French-English TM stores French text and corresponding translated English text. Creating a reasonably comprehensive TM is an extensive undertaking, and it is likely that the TM owner will want to receive remuneration from users of the TM. On the other hand, a TM user may be translating text that is confidential in nature, and may be unwilling to allow the Server to have access to the source text or the retrieved target text.

Another example of a natural language resource for which similar considerations may pertain is a phrase table for statistical machine translation (SMT). Here the input is a source language phrase and the output is a target language translated phrase and its statistics. Yet another example is a language model where the input is a word n-gram and the output includes n-gram statistics.

As another example of an application that would benefit from a highly secure retrieval protocol of the type addressed herein, consider an electronic encyclopedia. In this case the input is the search term that is to be looked up, and the output is the article for that word or phrase. Again, the owner of such an encyclopedia is likely to want to receive remuneration from users. (As an alternative commercial model, the encyclopedia may include advertisements sent to the user along with the retrieved article, and the owner may receive remuneration from the advertisers on the basis of the number of retrieved articles that are sent out with the advertisor's advertisements. As an alternative non-profit model, the encyclopedia may receive operational support from a philanthropic organization and the owner or maintainer may need to provide article retrieval statistics to justify, or increase, the operational support).

On the other hand, a user of the encyclopedia who is researching a confidential matter may be unwilling to allow the owner to know which articles are retrieved by the user, as such information could enable the owner to guess the research topic and hence gain insight into the confidential matter.

In spite of such potential applications, achieving highly secure database retrieval protocols has heretofore been difficult. The following sets forth improved methods and apparatuses.

BRIEF DESCRIPTION

In some illustrative embodiments disclosed as illustrative examples herein, a method comprises: using a first electronic processing device, encrypting the entries of a hash table using a first cryptographic process and performing a first permutation process to reorder the entries of the hash table to generate a first-processed hash table; using a second electronic processing device, encrypting the entries the first-processed hash table using a second cryptographic process that is commutative with the first cryptographic process and performing a second permutation process that is commutative with the first permutation process to reorder the entries of the first processed hash table to generate a first-and-second-processed hash table; and using the first electronic processing device, decrypting the entries of the first-and-second-processed hash table using the first cryptographic process and undoing the performing of the first permutation process to generate a double-blind hash table.

In some illustrative embodiments disclosed as illustrative examples herein, an apparatus comprises a first electronic processing device configured to perform a first cryptographic process and a first permutation process, and a second electronic processing device configured to perform a second cryptographic process that is commutative with the first cryptographic process and a second permutation process that is commutative with the first permutation process. The first electronic processing device is not configured to perform the second cryptographic process and is not configured to perform the second permutation process. The second electronic processing device is not configured to perform the first cryptographic process and is not configured to perform the first permutation process. The first and second electronic processing devices are configured to cooperatively prepare a double-blind hash table from a hash table that is available at the first electronic device and is unavailable at the second electronic processing device, the preparation method comprising: using the first electronic processing device to encrypt and reorder the entries of the hash table using the first cryptographic process and the first permutation process to generate a first-processed hash table; using the second electronic processing device to encrypt and reorder the entries of the first-processed hash table using the second cryptographic process and the second permutation process to generate a first-and-second-processed hash table; using the first electronic processing device to decrypt the entries of the first-and-second-processed hash table using the first cryptographic process and to undo the reordering performed by the first permutation process to generate the double-blind hash table; and storing the double-blind hash table at the first electronic processing device.

In some illustrative embodiments disclosed as illustrative examples herein, an apparatus comprises a first electronic processing device configured to store a double-blind hash table comprising a hash table whose entries are encrypted using a cryptographic process and whose entries are reordered using a permutation process, and a second electronic processing device configured to perform the cryptographic process and the permutation process. The first electronic processing device is not configured to perform the cryptographic process and is not configured to perform the permutation process. The first and second electronic processing devices are configured to cooperatively perform a double-blind hash table read method operating on the double-blind hash table stored at the first electronic processing device, the read method comprising: using the second electronic processing device to hash an index key and permute the hashed index key by applying the permutation process; using the first electronic processing device to retrieve an item from the double-blind hash table using the hashed and permuted index key; and using the second electronic processing device to decrypt the retrieved item using the cryptographic process.

In some illustrative embodiments disclosed as illustrative examples herein, an apparatus comprises first and second electronic processing devices that mutually exclusively execute first and second commutative cryptographic processes respectively and first and second commutative permutation processes respectively. The first electronic processing device has access to a hash table and the second electronic processing device does not have access to the hash table. The first and second electronic processing devices are configured to perform a method including: encrypting and reordering the hash table using the first electronic processing device executing the first cryptographic process and the first permutation process; communicating the encrypted and reordered hash table from the first electronic device to the second electronic processing device; further encrypting and further reordering the hash table using the second electronic processing device executing the second cryptographic process and the second permutation process; communicating the further encrypted and further reordered hash table from the second electronic processing device to the first electronic processing device; and partially decrypting and partially undoing the reordering of the further encrypted and further reordered hash table using the first electronic processing device executing the first cryptographic process and the first permutation process to generate a double-blind hash table.

DETAILED DESCRIPTION

Figure 1:
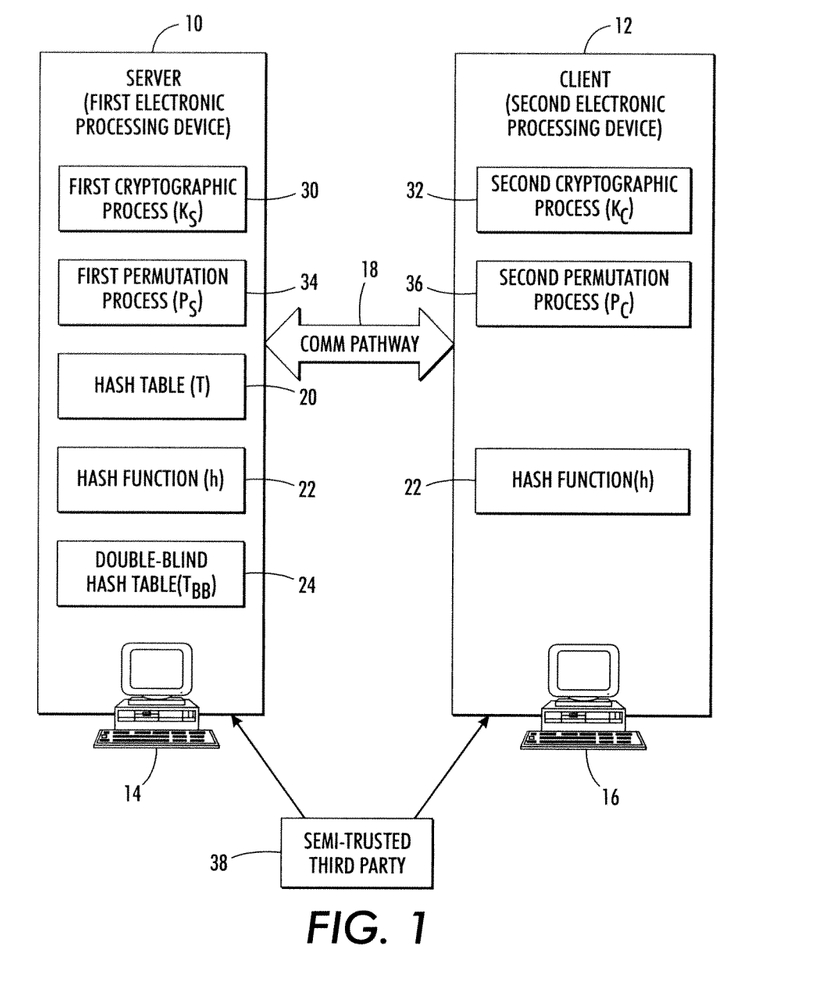
FIG. 1 diagrammatically shows a server-client system enabling the client to obtain confidential retrieval access to a double-blind hash table.

With reference to FIG. 1, the disclosed secure database systems and methods are described in the context of a server 10 that maintains the database, and a client 12 that securely reads entries of the database while the knowledge obtainable by the server 10 is limited to counting the number of retrieved items. The terms "server" 10 and "client" 12 are used herein for convenience and to reflect a common practical situation in which the database owner maintains a server that is accessed by paying or nonpaying clients. More generally, the server 10 denotes a first electronic processing device 10, and the client 12 denotes a second electronic processing device 12. The first electronic processing device 10 may, for example, be a computer 14 which may be a server computer, a personal desktop or notebook computer (which may be configured as a server), or so forth. The second electronic processing device 10 may, for example, be a computer 16 which may be a personal desktop or notebook computer, a personal data assistant (PDA), smartphone, or other portable electronic processing device, or so forth.

The server 10 and client 12 are isolated from one another, by which it is meant that the server 10 includes memory and processing that is not accessible by the client 12 without affirmative action by the server 10, and the client 12 includes memory and processing that is not accessible by the server 10 without affirmative action by the client 12. (This does not preclude the possibility that the server and client may jointly have access to other "shared" memory and/or shared processing resources, but such possibility is not illustrated in FIG. 1). A communication pathway 18 provides communication between the server 10 and client 12. The server 10 may affirmatively communicate information from its memory to the client 12 via the communication pathway 18, and vice versa. By way of illustrative example, the communication pathway 18 may be the Internet, and the client 12 may request information from the server 10 via the Internet and the server 10 may communicate such information to the client 12 via the Internet.

The server 10 has access to a database that is structured as a hash table 20, also denoted herein as hash table T. The client 12 does not have access to the hash table 20. A hash table is a data structure storing entries in which each entry comprises a <key, value> pair, where "key" denotes an index key. The hash table format enables an adjustable compromise between space requirements on one hand and insertion, deletion and lookup time on the other. The hash table T 20 is a table of size m (that is, there are m entries or m rows of the table). A hash function 22, denoted herein as hash function h, maps key values to rows of the hash table 20. A suitable hash function should be deterministic, easy to compute, and should distribute keys uniformly over the m rows of the hash table 20.

In order to insert a <x, v> key-value pair (i.e., entry) into the hash table 20, one stores the pair in an array or other data structure located at position T(h(x)) of the hash table 20. To retrieve the value associated to an index key x, one retrieves T(h(x)). Optionally, the retrieval also includes verifying that x=T(h(x)).key. Such a verification is advantageous if there is a possibility that the hash function maps multiple keys to a same value in its range: these events are called collisions. Various ways exist for dealing with collisions, typically involving trading lookup time with storage space. The hash table 20 is assumed to be a static hash table, by which it is meant that entries are inserted in it once for all, and thereafter the hash table is only read. Said another way, the hash table 20 of FIG. 1 can be viewed as a "read-only" hash table.

A hash table stores <x,v> pairs, where x is called an "index key" (or just "key") and v is a value associated with the index key x. A hash table is a suitable data structure for storing and accessing an associative map as it associates or maps value v to index key x. Associative maps can be used for various practical applications. One such application is a natural language translation memory (TM). In this application, the source language text segments of the TM define index keys of the hash table 20 and target language text segments of the TM define values of the hash table 20 that are indexed by the index keys. Another application is a natural language phrase table. In this application, source language phrases of the phrase table define index keys of the hash table 20, and target language phrases and associated statistics of the phrase table define values of the hash table 20 that are indexed by the index keys. Another application is a language model, in which the indexing keys of the hash table 20 are word n-grams and the values of the hash table 20 are n-gram statistics. Yet another illustrative application is an encyclopedia. In this application, search terms of the encyclopedia define index keys of the hash table 20 and articles of the encyclopedia define values of the hash table 20 that are indexed by the index keys. These are merely non-limiting illustrative applications of the hash table 20.

In a typical unsecured hash table application, a user obtains or generates an index key x for which the user wants to look up its corresponding value v. The user applies the hash function h to the key to generate a hashed value h(x), the server retrieves the entry <x,v> located at row h(x) of the hash table, and an optional verification is performed to ensure that the index key of the entry <x,v> matches the original index key x. Such an approach is unsecured in that the server receives h(x) and can (at least in principle) read the retrieved entry <x,v> prior to sending it to the user. (Actually, in such an unsecured application, there is no necessity to have distinct "server" and "client" entities, and the entire process could be performed by a single entity).

The disclosed approaches enable secured (i.e., private) read access to a static hash table. By using the disclosed approaches, the server 10 (for example, the owner or maintainer of a Translation Memory embodied as the hash table 20) discloses only that portion of the hash table 20 that is requested by the client 12, and can count the number of retrieved items (for example, to assess an access fee, or to maintain usage statistics). Also, by using the disclosed approaches the client 12 (e.g., a translator utilizing the TM) does not disclose the key (which in this application would be source text) to the server 10.

The disclosed secure or private hash table read approaches convert the hash table 20 into a "double-blind" hash table 24, also denoted herein as $T_{BB}$. The processing that constructs the double-blind hash table 24 employs two cryptographic processes: a first cryptographic process 30 (denoted $K_S$ herein) performed by the server 10 (i.e., by the first electronic processing device 10) and a second cryptographic process 32 (denoted $K_C$ herein) performed by the client 12 (i.e., by the second electronic processing device 12). The first and second electronic processing devices 10, 12 mutually exclusively execute the first and second cryptographic processes 30, 32, respectively. In other words, the server 10 does not have access to the second cryptographic process $K_C$ 32, and the client 12 does not have access to the first cryptographic process $K_S$ 30.

The first and second cryptographic processes 30, 32 have another property: they are a commutative pair. This means that when an object (here the entries of the hash table T 20) is encrypted using both cryptographic processes 30, 32, it can be decrypted by applying the cryptographic processes 30, 32 in any order. For example, if T denotes the hash table T 20 after encryption by both the first cryptographic algorithm $K_S$ 30 and the second cryptographic processes $K_C$ 32, then $T=K_S^{-1}(K_C^{-1}(T^{}))=K_C^{-1}(K_S^{-1}(T^{**}))$ (where $K_S^{-1}$ and $K_C^{-1}$ denote the cryptographic processes 30, 32, respectively, applied to perform decryption). In a suitable embodiment, both cryptographic processes 30, 32 employ the same cryptographic algorithm but different cryptographic keys, and the cryptographic algorithm is a key-based commutative cryptographic algorithm ("commutative" here meaning that the decryption keys can be applied in any order). An illustrative example of a commutative cryptographic algorithm is the commutative version of the Rivest, Shamir, and Adleman (RSA) cryptographic algorithm (available at http://www.antifraudlabs.com/presentations/pages/security_comm_RSA.aspx, last accessed Jul. 21, 2011).

In another illustrative approach, the cryptographic processes 30, 32 can be employ different, mutually independent cryptographic algorithms in order to achieve the commutative property. For example, in the case of textual data if the first cryptographic process 30 employs letter substitution (e.g., replacing every letter "a" by the letter "b", and so forth) and the second cryptographic process 32 employs letter rearrangement (e.g., swapping the first and fifth letter, second and sixth letters, and so forth), then these cryptographic processes can be applied in any order and are commutative. (Note: these simple illustrative cryptographic algorithms would be unlikely to provide an acceptable level of security).

The processing that constructs the double-blind hash table 24 also employs two permutation processes: a first permutation process 34 (denoted $P_S$ herein) performed by the server 10 and a second permutation process 36 (denoted $P_C$ herein) performed by the client 12. The first and second electronic processing devices 10, 12 mutually exclusively execute the first and second permutation processes 34, 36, respectively. In other words, the server 10 does not have access to the second permutation process $P_C$ 36, and the client 12 does not have access to the first permutation process $P_S$ 34.

The first and second permutation processes 34, 36 have another property: they are a commutative pair. This means that when an ordered set of objects (here the entries of the hash table T 20) are reordered using both permutation processes 34, 36, the result is the same regardless of what order the permutations are applied. That is, $T^{\#\#\#}=P_S(P_C(T))=P_C(P_S(T))$. It follows that the reordering can be undone by applying the (inverse) permutation process in any order, that is, $T=P_S^{-1}(P_C^{-1}(T^{\#\#\#}))=P_C^{-1}(P_S^{-1}(T^{\#\#\#}))$ (where $P_S^{-1}$ and $P_C^{-1}$ denote the permutation processes 34, 36, respectively, applied to undo the reordering produced applying $P_S$ and $P_C$, respectively). For the static hash table T 20 which has m rows, each permutation process 34, 36 can be represented as an m×m array of ones (1's) and zeroes (0's) where a "1" at the element (x,y) denotes that row x should be reordered to row y. Since $P_S$ and $P_C$ are commutative, any diagonal element that has value "1" in one permutation process would necessarily also have value "1" in the other permutation process—accordingly, to maximize security the m×m matrices representing the permutation processes 34, 36 should have all-zero diagonal elements. Some suitable commutative permutation processes are disclosed elsewhere herein.

It will be noted that ensuring the commutative property for the cryptographic processes 30, 32 and ensuring the commutative property for the permutation processes 34, 36 entails some level of coordination between the server 10 and the client 12. In some embodiments, this coordination can be achieved without communication of any confidential information. For example, if the cryptographic processes 30, 32 are to employ a common commutative cryptographic algorithm and different cryptographic keys for the two cryptographic processes 30, 32, then the required coordination is limited to agreement to use the common commutative cryptographic algorithm and (for some commutative cryptographic algorithms) agreement to employ some common constraint(s) on the selection of the cryptographic keys. Such coordination can be performed directly between the server 10 and client 12. Similarly, some commutative permutation processes disclosed herein can be implemented with direct communication between the server 10 and client 12 without disclosing any confidential information.

With continuing reference to FIG. 1, on the other hand, in some embodiments the selection of the commutative cryptographic processes and/or commutative permutation processes may require knowledge that would, if in possession of the other party, possibly compromise security. In such cases, it is contemplated to employ an optional "semi-trusted" third party 38 who (or that) serves as a conduit for confidential information sufficient to establish the commutative elements of the hash table reading system. For example, in some embodiments the "semi-trusted" third party 38 generates the two permutation processes 34, 36 and ensures the commutative property of the pair, and then conveys the first permutation process 34 to the server 10 and the second permutation process 36 to the client 12. In this case the semi-trusted third party does not have access to either cryptographic process 30, 32, and so a high level of security is maintained. (There is some trust involved, however, since for example the semi-trusted third party 38 could collude with the server 10 by providing the same permutation process to both the server and the client and informing only the server of this fact, in which case the server would know the permutation process $K_C$ which could be useful in breaching the client's security).

With continuing reference to FIG. 1, in order for the client 12 to request an entry of the double-blind hash table 24, the client should have the hash function h 22 that is used for hashing index keys when reading the (original) hash table 20. Typically, the server 10 created or owns the hash table 20 and accordingly has access to the hash function 22. In the approaches disclosed herein, this hash function 22 can be conveyed from the server 10 to the client 12, so that the client 12 also has access to the hash function 22.

The adjective "double-blind" in referring to the double-blind hash table $T_{BB}$ 24 denotes that (1) the double-blind hash table $T_{BB}$ 24 is in possession of the server 10 but is encrypted and reordered using the client's cryptographic process 32 and permutation process 36, respectively, and (2) before the hash table 20 is conveyed to the client 12 for this encryption/reordering it is first encrypted/reordered by the server 10 using the server's cryptographic process 30 and permutation process 34, respectively. "Blinding" aspect (1) ensures that during read operations the server 10 does not gain knowledge of the items retrieved by the client 12, while "blinding" aspect (2) ensures that the client 12 does not gain access to the hash table 20 during preparation of the double-blind hash table 24. The use of commutative cryptographic processes 30, 32 and commutative permutations 34, 36 enables both blinding aspects (1) and (2) to be combined in order to prepare and read the double-blind hash table $T_{BB}$ 24.

Briefly the preparation process is as follows. The server 10 encrypts and reorders the hash table 20 using its processes 30, 32 and conveys this encrypted/reordered hash table to the client 12. The client 12 then (further) encrypts and reorders the hash table 20 using its processes 34, 36 and conveys this (further) encrypted/reordered hash table back to the server 10. Finally, the server 10 undoes (i.e., decrypts) its encryption and undoes its reordering in order to generate the double-blind hash table 24 which resides at the server 10 but is encrypted/reordered using the processes 34, 36 of the client 12. This last step (server decryption/undoing server reordering at the server 10) is enabled because of the commutative property of the cryptographic and permutation processes.

Figure 2:
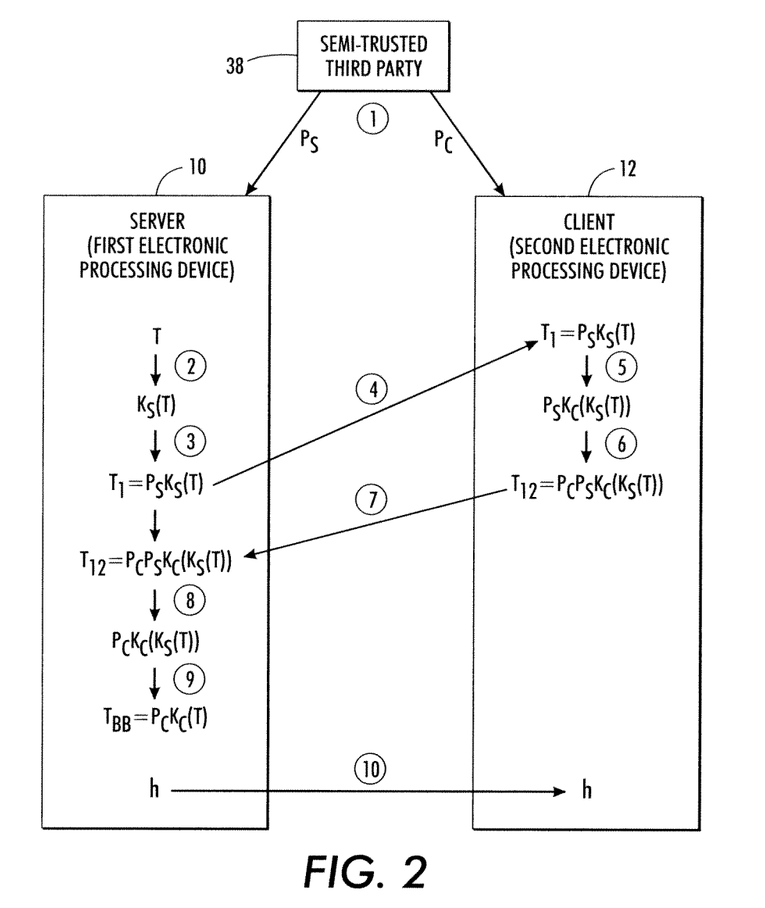
FIG. 2 diagrammatically shows processing performed cooperatively by the server and client in order to securely generate the double-blind hash table.

With reference to FIG. 2, an illustrative example of the preparation of the double-blind hash table 24 is described in further detail. The illustrative preparation process is diagrammatically represented in FIG. 2 using ten operations labeled by circle-enclosed numbers "1" through "10". In Operation "1", the semi-trusted third party 38 generates the two commutative permutation processes 34, 36 and conveys these processes to the server 10 and client 12, respectively. (In some other embodiments disclosed herein, this Operation "1" is replaced by permutation process generation operations performed at the server and client, respectively, and the third party 38 is omitted entirely). In Operation "2" the server 10 encrypts the entries of the hash table 20 (i.e. computes $K_S(T)$). In Operation "3" the server 10 reorders the entries of the (once-encrypted) hash table (i.e. computes $P_S K_S(T)$). Note that in some embodiments the server-side encryption and permutation operations are themselves commutative, so that Operations "2" and "3" can be reversed in these embodiments (in effect computing $K_S P_S(T)$ which equals $P_S K_S(T)$). The resulting once-encrypted and once-reordered hash table is denoted herein as $T_1 = P_S K_S(T)$, where the subscript "1" on $T_1$ denotes single encryption/reordering by the server 10.

In an operation "4" the once-encrypted and once-reordered hash table $T_1$ is communicated from the server 10 to the client 12. At this point the client 12 has access to $T_1$, but since $T_1$ is encrypted and reordered by processes 30, 34 that are not available to the client 12 this does not provide the client with access to the underlying informational content of the hash table T 20, which remains stored only at the server 10.

In Operation "5" the client 12 (further) encrypts the entries of the hash table $T_1$ (i.e. computes $K_C(T_1)$). In Operation "6" the client 12 (further) reorders the entries of the twice-encrypted and once reordered hash table (i.e. computes $P_C K_C(T_1)$). Note that in some embodiments the client-side encryption and permutation operations are themselves commutative, so that Operations "5" and "6" can be reversed in these embodiments (in effect computing $K_C P_C(T_1)$ which equals $P_C K_C(T_1)$). The resulting twice-encrypted and twice-reordered hash table is denoted herein as $T_{12} = P_C P_S K_C(K_S(T))$, where the subscript "12" on $T_{12}$ denotes double encryption/reordering by both the server 10 and the client 12.

In an operation "7" the twice-encrypted and twice-reordered hash table $T_{12}$ is communicated from the client 12 back to the server 10.

In Operation "8" the server 10 (partially) decrypts the entries of $T_{12}$ using the first cryptographic process 30 (i.e., computes $K_S^{-1}(T_{12})$. In Operation "9" the server 10 (partially) undoes the reordering of the entries using the first permutation process 34 (i.e. computes $P_S^{-1} K_S^{-1}(T_{12})$). Note again that in some embodiments the server-side decryption and permutation operations are themselves commutative, so that Operations "8" and "9" can be reversed in these embodiments (in effect computing $K_S^{-1} P_S^{-1}(T_{12})$ which equals $P_S^{-1}/K_S^{-1}(T_{12})$). The resulting hash table is the double-blind hash table $T_{BB}$ 24 (i.e., $T_{BB} = P_S^{-1} K_g^{-1}(T_{12})$). The double-blind hash table $T_{BB}$ 24 is once-encrypted and once-reordered, but now by the client-side processes 32, 36. Since the double-blind hash table $T_{BB}$ 24 is stored at the server 10, which does not have access to the client-side cryptographic/permutation processes 32, 36, the server 10 does not know which entries of the original hash table 20 are stored in which rows of the double-blind hash table $T_{BB}$ 24.

The preparation also includes communicating the hash function h 22 from the server 10 to the client 12 in an operation "10". As will be seen when the reading of the double-blind hash table $T_{BB}$ 24 is described, the client 12 uses the hash function 22 in retrieving items from the double-blind hash table $T_{BB}$ 24.

Figure 3:
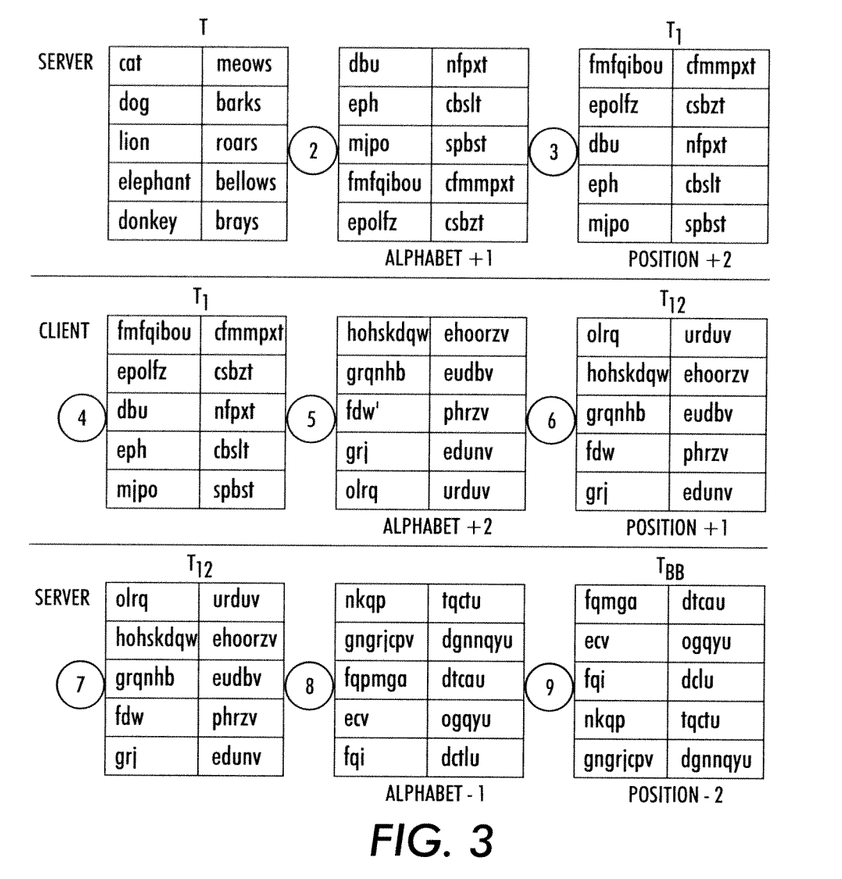
FIG. 3 shows an illustrative set of tables that provide an example of the processing of FIG. 2.

With brief reference to FIG. 3, an illustrative example of the preparation processing performed in FIG. 2 is illustrated using a simple hash table T that includes m=5 rows. In this simple illustrative hash table, the set of index keys are animals: "cat", "dog", "lion", "elephant", and "donkey", and the set of corresponding values are corresponding vocalizations, i.e. the <key,value> entries are <"cat","meows">, <"dog", "barks">, <"lion","roars">, <"elephant","bellows">, and <"donkey","brays">. The hash function maps index keys to row numbers, i.e. h("cat")=1, h("dog")=2, h("lion")=3, h("elephant")=4, and h("donkey")=5. In the example of FIG. 3, a commutative cryptographic algorithm is used, namely one in which each letter is replaced by the one following it in the alphabet by a number of positions specified by a cryptographic key. The server 10 employs a value of "+1" for the cryptographic key, while the client employs a value of "+2" for the cryptographic key. The permutation process for the server is to advance each entry by two rows. The permutation process for the client is to advance each entry by one position. It is readily apparent that these permutation processes are commutative, i.e. the same reordering is obtained regardless of the order in which the two permutation processes are applied.

The read operation uses the double-blind hash table $T_{BB}$ 24, which is encrypted/reordered using only the client's processes 32, 36. If this table was available at the client 12, then it could read an entry for an index key x by hashing the key (i.e., computing h(x)), permuting the result (i.e., computing $P_C(h(x))$), reading row $P_C(h(x))$ of $T_{BB}$, and decrypting the result using the client-side cryptographic process 32. But, in this case the server 10 could not track the number of items that have been read, and moreover, the client could gain access to the entire original hash table h 20 by applying processes 32, 36 over $T_{BB}$.

In the disclosed approaches, the double-blind hash table $T_{BB}$ 24 is stored at the server 10. Thus, the client 12 sends the hashed and permuted key $P_C(h(x))$ to the server 10 which then reads row $P_C(h(x))$ of the double-blind hash table $T_{BB}$ 24 and sends the entry to the client 12 which then decrypts it using the client-side cryptographic process 32. The server cannot gain any insight into what information the client has requested and obtained, because the read entry is encrypted using the client-side cryptographic process 32, to which the server 10 has no access. Moreover, because the server 10 also does not have access to the client-side permutation process 36, the server 10 does not learn which row of the original hash table 20 the client has retrieved.

Figure 4:
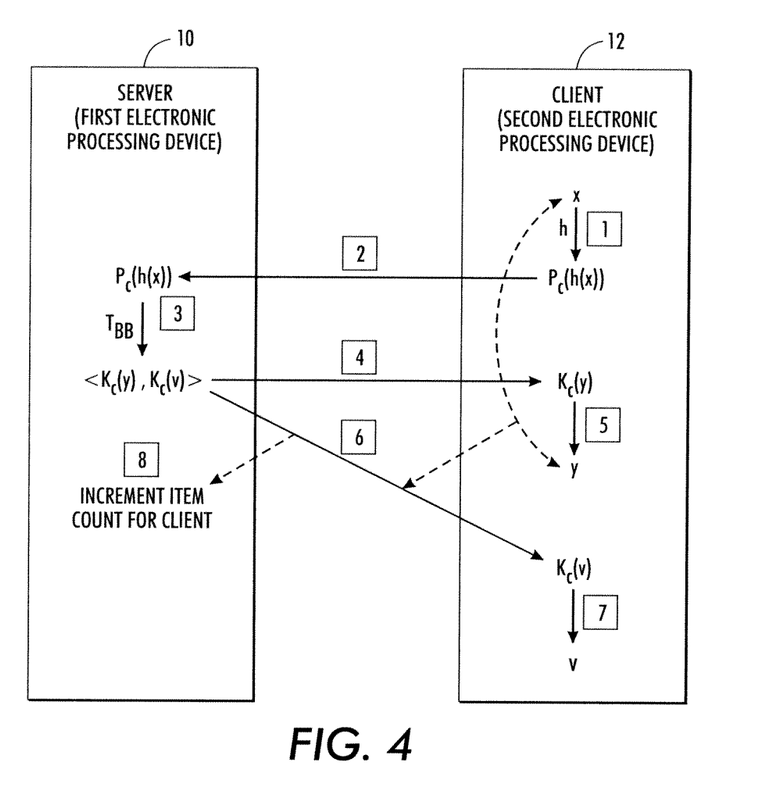
FIG. 4 diagrammatically shows processing performed cooperatively by the server and client in order to allow the client to securely read the double-blind hash table while allowing the server to count retrieved items.

With reference to FIG. 4, an illustrative example of reading the double-blind hash table 24 is described in further detail. The illustrative read process is diagrammatically represented in FIG. 4 using eight operations labeled by square-enclosed numbers "1" through "8". In Operation "1", the client 12 hashes the index key x (i.e., computes h(x)) and permutes the result (i.e., computes $P_C(h(x))$). In an operation "2", the hashed and permuted key $P_C(h(x))$ is communicated from the client 12 to the server 10. In operation "3", the server then reads the entry at row $P_C(h(x))$ of the double-blind hash table $T_{BB}$ 24.

The read entry includes both a stored index key y and a stored value v, both encrypted using the client-side cryptographic process $K_C$ 32. Thus, the read entry can be denoted as $<K_C(y),K_C(v)>$. (Note that this example assumes independent encryption of the index key y and the value v. In some embodiments, a more integrated encryption is performed, examples of which are disclosed elsewhere herein). At this point, the entire read entry $<K_C(y),K_C(v)>$ could be sent back to the client 12. However, there is the possibility that a collision or other error has occurred. If so, then simply sending the entire entry $<K_C(y),K_C(v)>$ to the client 12, and counting this as a retrieved item, could produce an erroneous count (that is, a count of a retrieval that was not successfully completed).

To reduce the likelihood of such an error, in the read example of FIG. 4 the read entry is conveyed back to the client 12 in two parts. First, operation "4" communicates only the index key portion $K_C(y)$ from the server 10 to the client 12. In an operation "5" the client 12 decrypts the key portion $K_C(y)$ using the client-side cryptographic process 36 to retrieve the key y that is stored (in encrypted form) at row $P_C(h(x))$ of the double-blind hash table $T_{BB}$ 24. If the stored index key y matches the original key x (i.e., x=y) (comparison diagrammatically indicated by a dashed curved line with double arrowheads in FIG. 4), then the client 12 requests that operation "6" be performed (request indicated by dashed arrow "triggering" operation "6" in FIG. 4). Operation "6" completes the communicating of the retrieved entry $<K_C(y),K_C(v)>$ of the double-blind hash table $T_{BB}$ 24 from the server 10 to the client 12. Note that operation "6" can convey either the entire entry $<K_C(y),K_C(v)>$ or, since the key portion $K_C(y)$ has already been sent in operation "4", can send only the encrypted value portion $K_C(v)$. In either case, the client 12 performs operation "7" in which the encrypted value portion $K_C(v)$ is decrypted using the client-side cryptographic process 36 to retrieve the value v that is stored (in encrypted form) at row $P_C(h(x))$ of the double-blind hash table $T_{BB}$ 24. At the server 10, the operation "6" triggers an operation "7" in which the item retrieval count for the client 12 is incremented to reflect the latest retrieval operation "6".

With brief reference to FIG. 5, an illustrative example of the read processing performed in FIG. 4 is illustrated using the double-blind hash table $T_{BB}$ whose preparation was described with reference to FIG. 3. In this example the client 12 seeks the value for the key "donkey". The client 12 performs operation "1" in which the key "donkey" is hashed (h("donkey")=5) and permuted according to (h(donkey)+1)$_{mod\ 5}$=1. This hashed and permuted index key is communicated to the server 10 in operation "2", the server reads row 1 of $T_{BB}$ in operation "3" and receives the encrypted index key portion "fqpmga". This encrypted key portion is sent to the client 12 in operation "4" and the client decrypts it in operation "5" using the client-side cryptographic process 32 to obtain the stored key "donkey", which does indeed match the original key "donkey". Thus verified, the client 12 triggers the operation "6" in which the server 10 completes the sending of the entry by sending the encrypted value "dtcau" to the client 12. The client 12 then decrypts this value to obtain the plaintext value "brays" in operation "7". (Operation "8" is not shown in FIG. 5).

Figure 5:
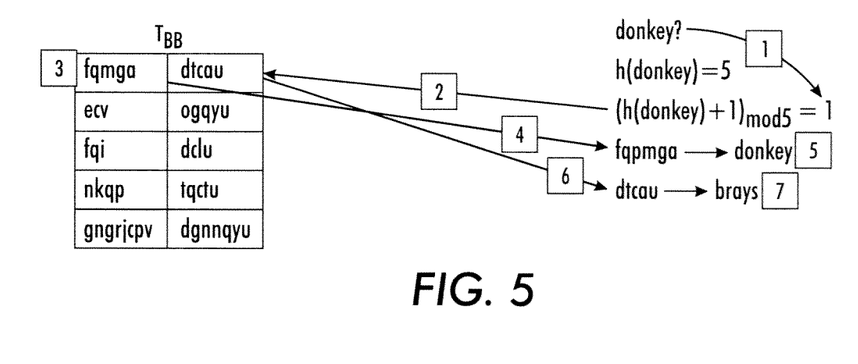
FIG. 5 shows an illustrative set of tables that provide an example of the processing of FIG. 4.

In the hash table read approach of FIGS. 4 and 5, the operation "6" is triggered by the client 12 responsive to the client 12 verifying that the stored key y equals the original key x. This verification is intended to avoid counting an item retrieval that fails due to collision or some other problem. Thus, it is primarily a protection for the client 12 (e.g., in a "pay-per-retrieval" business model it prevents the client from paying for a failed retrieval). On the other hand, nothing in the approach of FIGS. 4 and 5 would prevent the client 12 from "lying" by triggering the retrieval if the stored key y did not match the original key x. Typically, there would be no value to the client 12 in doing this. Nonetheless, the read approach can optionally be modified to prevent such an occurrence.

Figure 6:
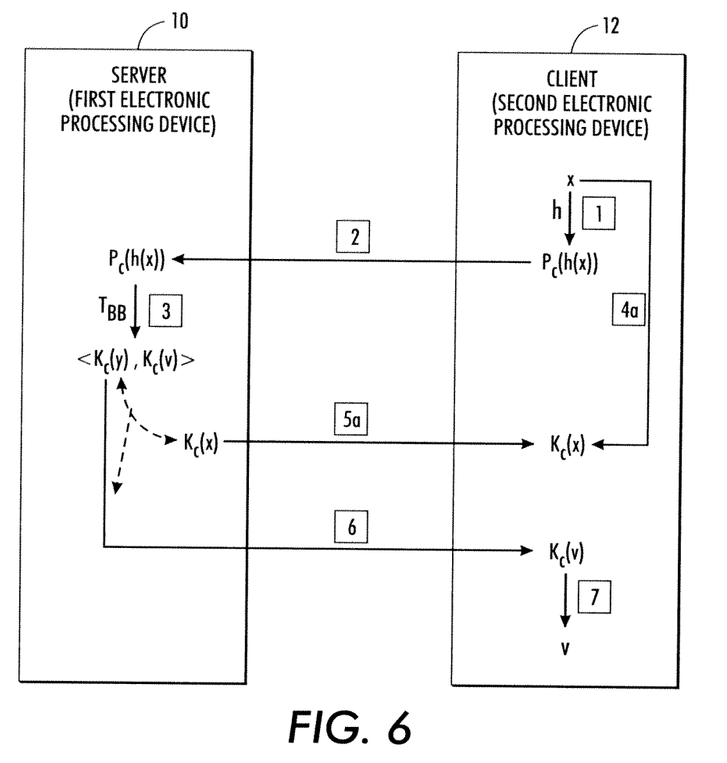
FIG. 6 diagrammatically shows alternative processing optionally substituted for the processing of FIG. 4.

With reference to FIG. 6, a modified read process includes the operations "1", "2", and "3" as in FIG. 4, via which the client 12 hashes and permutes the index key x, sends the hashed and permuted key $P_C(h(x))$ to the server 10, and the server reads row $P_C(h(x))$ of the double-blind hash table $T_{BB}$ 24. In the modified embodiment of FIG. 6, however, the index key portion send operation "4" and the client-side verification operation "5" of the embodiment of FIG. 4 are replaced by operations "4a" and "4b". In operation "4a", which is performed by the client 12, the index key x is encrypted to generate $K_C(x)$. In operation "5a", the encrypted key $K_C(x)$ is communicated from the client 12 to the server 10. The verification is then performed by the server 10, by verifying that the stored encrypted key $K_C(y)$ matches the encrypted key $K_C(x)$. Notice that the server 10 never gains insight into the unencrypted value x (or unencrypted value y) in this verification, because all values seen by the server 10 are encrypted using the client-side cryptographic process 32 to which the server 10 has no access. If the verification is successful, then the operations "6", "7", and "8" are performed as already described with reference to FIG. 4 in order to retrieve and decrypt the value v. Optionally, the operation "6" sends the entire entry $<K_C(y),K_C(v)>$ to the client 12, which then can optionally perform decryption operation "5" to recover the stored key y and compare same with x (as shown in FIG. 4) to perform verification independently of the server-side verification shown in FIG. 6.

In the illustrative examples, the hash table 20 is a static hash table, meaning that all index keys of all the items that are to be inserted in the hash table are known at the time the hash table 20 itself is created. In such a case, collisions may be avoided entirely by a process of exhaustion. One can try candidate hash functions w(x) ranging over a large index range until one is found that does not induce any collisions on the (static) set of keys. A collision-free hash function h on a minimal index range is then constructed by creating a lookup table F with w(x) as key and the number of keys y with w(y)<w(x) as values. h(x)=F(w(x)) is then a collision-free hash function over a minimal index set with the desired property. A disadvantage of this approach is that lookup typically entails a non-constant (e.g., logarithmic) binary search on the table F.

The illustrative examples assume exact index keys. In other words, it is assumed that the index key x generated by the client 12 exactly matches the stored key y that is stored at row h(x) of the hash table 20. This assumption excludes "fuzzy" matches, which can be useful in some applications. For example, in a translation memory (TM) application the exact match requirement eliminates retrieval of "close" but inexact TM entries, for example entries that differ from the input source language sentence to be translated by only one or two words. It is contemplated to relax the exact key match requirement, for example by employing an imperfect hash function that produces a match if the index key x is "close enough" (for example, as measured by a suitable distance function) to a stored key y of the hash table 20. In such a case, the retrieval described with reference to FIGS. 4-6 is suitably modified by relaxing the verification to accept these "close" but not perfect matches, i.e. the verification condition x=y of FIG. 4 can be replaced by $d(x,y)<T_{th}$ where d(.) is a distance function and $T_{th}$ is a threshold defining "close enough" for a match.

The disclosed double-blind hash table preparation and reading approaches provide the desired security aspects. However, the actual level of security obtained in a specific system depends upon implementation details such as the specific choices for the commutative cryptographic processes 30, 32 and the specific choices for the commutative permutation processes 34, 36. It is apparent that using strong ciphers for the cryptographic processes 30, 32, and reasonably complex reordering algorithms for the permutation processes 34, 36, is advantageous for attaining a high security level. In the following, some additional aspects for enhancing security are set forth.

In the illustrative examples, it is assumed that the index keys and corresponding values are encrypted separately. For example, the client-side encryption of entry $<x,v>$ is $<K_C(x), K_C(v)>$ denoting that index key x is encrypted to form $K_C(x)$ and the corresponding value v is separately encrypted to form the encrypted value $K_C(v)$. This approach is advantageous for applications such as translation memory (TM) applications, in which the set of all possible values is very large and the expected lookup frequency of different elements follows a relatively flat distribution.

In the case of a language model lookup, however, where values could be raw integer n-gram frequency counts in a corpus, the separate key and value encryption approach could present a security risk, in that the server could leverage known facts about the distribution of word frequencies to attack the deterministic cryptographic process $K_C$ used by the client. In a language model (LM), where values could be sheer frequency counts, the server could attack the client encryption $K_C$ by matching the frequency histogram of encrypted values with the n-gram frequency histogram.

To enhance security in such cases, it is advantageous to encrypt key-value pairs jointly. To this end, preparation phase (e.g., FIGS. 2 and 3) is suitably modified to have the hash table T 24 contain entries of the form $<x,<x,v>>$ instead of $<x,v>$. Said another way, the value v is replaced by the value $<x,v>$. This combined value $<x,v>$ is encrypted jointly, to produce the encrypted item (using the client-side encryption $K_C$) as $<Kc(x), Kc(<x,v>)>$. With this modification, a reasonably strong client-side cryptographic process can ensure that the server cannot attack $K_C$ based on pairs $<Kc(x), Kc(<x,v>)>$. Note that during the read, operation "6" returns the encrypted value $Kc(<x,v>)$ which the client decrypts to recover $<x,v>$ from which it obtains the value v.

In the disclosed approaches, the server 10 and client 12 mutually exclusively execute first and second commutative permutation processes $P_S$ and $P_C$, respectively. To ensure security, the server 10 should not have access to the client-side permutation process $P_C$ 36, and the client 12 should not have access to the server-side permutation process $P_S$ 34. In order for the approach to work, however, the permutations $P_S$, $P_C$ must be a commutative pair. That is, they must be such that $Pc(Ps(\cdot))=Ps(Pc(\cdot))$. In principle, any commutative pair of permutations can be used. However, to enhance security the permutations $P_S$ and $P_C$ should have the following additional properties. First, the permutation processes should be such that by knowing one permutation process of the pair it should not be trivial to guess the other permutation process. Second, each permutation process $P_S$, $P_C$ should change the position of every entry of the input hash table. Said another way, a permutation matrix corresponding to the permutation process should have zero values along the entire diagonal of the permutation matrix.

This second property improves the level of security because if $P_C$ does not change the position of an element n, i.e. $P_C(n)=n$, then by the commutative property of $P_S$ and $P_C$ it must follow that $P_S(n)=n$. But since the server has access to $P_S$ it follows that the server would know (or at least could readily learn) that $P_S(n)=n$ and hence would know (or learn) that $P_C(n)=n$. That would mean that the server would know that row n of the double-blind hash table $T_{BB}$ contains $<K_C(n),K_C(v)>$, and this knowledge could be useful in attacking $K_C$.

One way to obtain pairs of commutative permutations with the desired properties is to employ the semi-trusted third party 38 to generate two permutation processes having compatible orbits. Given a permutation P over the integers $\{1, \ldots, m\}$, one can obtain its orbits by starting from the element 1 and repeatedly computing $P(1), P^2(1), \ldots, P^n(1)$ until $P(1)=P^n(1)$. The elements in the sequence identify the first orbit. The smallest integer outside the orbits found so far is then found, and the orbit starting from it is computed. The process is repeated until all elements in $\{1, \ldots, m\}$ are assigned to an orbit.

For example, consider the permutation P mapping integers $\{1, 2, 3, 4, 5, 6\}$ into integers $\{2, 6, 5, 3, 4, 1\}$. The first orbit is $(1, P(1)=2, P(P(1))=P(2)=6)$. This follows because $P^3(1)=P(6)=1$. The first integer not in this orbit is 3. The second (and last) orbit is found as $(3, P(3)=5, P^2(3)=4)$, since $P^3(3)=P(4)=3$. So, permutation P has the two orbits $O_1=(1, 2, 6)$ and $O_2=(3, 5, 4)$.

An orbit can also be seen as a component of the permutation P that acts like P on all the integers in the orbit and acts like the identity permutations on all the others. In terms of permutation matrices it is then:

$$P = \prod_{j \in orbits} P_j$$

For the examples above, for instance, it is:

$$P = \begin{bmatrix} 0 & 0 & 0 & 0 & 0 & 1 \\ 1 & 0 & 0 & 0 & 0 & 0 \\ 0 & 0 & 0 & 1 & 0 & 0 \\ 0 & 0 & 0 & 0 & 1 & 0 \\ 0 & 0 & 1 & 0 & 0 & 0 \\ 0 & 1 & 0 & 0 & 0 & 0 \end{bmatrix} =$$

$$P_1 P_2 = \begin{bmatrix} 0 & 0 & 0 & 0 & 0 & 1 \\ 1 & 0 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 1 & 0 & 0 & 0 & 0 \end{bmatrix} \begin{bmatrix} 1 & 0 & 0 & 0 & 0 & 0 \\ 0 & 1 & 0 & 0 & 0 & 0 \\ 0 & 0 & 0 & 1 & 0 & 0 \\ 0 & 0 & 0 & 0 & 1 & 0 \\ 0 & 0 & 1 & 0 & 0 & 0 \\ 0 & 0 & 0 & 0 & 0 & 1 \end{bmatrix}$$

Two single-orbit permutations $P_i$ and $P_j$ for i and j distinct orbits of P commute, since they act on disjoint subsets of indices. Two permutations can now be generated from P as follows:

$$P_C = \prod_{j \in orbits} P_j^{C_j}; P_S = \prod_{j \in orbits} P_j^{S_j}$$

where $c_j$ and $s_j$ are random integers between 1 and the size of the j-th orbit minus one. $P_C$ and $P_S$ thus differ in the number of steps each orbit in the base permutation P is advanced. It can be seen that $P_C$ and $P_S$ commute, with:

$$P_S P_C = P_C P_S = \prod_{j \in orbits(P)} P_j^{C_j + S_j}$$

The foregoing is merely an illustrative example of a way to generate suitable permutation processes $P_S$ and $P_C$, and other commutative permutation processes can also be used.

If the illustrative orbits-based permutation process construction is employed, and the entries of the permuted hash table were accessible as plaintext, then it would be easy to reconstruct $P_C$ from $P_S$ and $P_C P_S$, both of which are available to the server 10. This reconstruction could be done by first identifying the orbits of $P_C$ and then testing all possible values of the exponents for each orbit until one restoring the identity permutation is found. In the secure (i.e. private) hash table read approaches disclosed herein, however, this reconstruction is not possible because the client 12 not only permutes the entries, but also encrypts the entries. Thus, it is impossible for the Server to know what exponents reconstruct the identity. if the illustrative orbits-based permutation process construction is used for generating commutative permutations $P_S$ and $P_C$, then the semi-trusted third party 38 can optionally be omitted. This is because either the server 10 or the client 12 can generate the base permutation P, or equivalently a description of its orbits, and send it over to the other party.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method comprising:
   using a first electronic processing device, encrypting the entries of a hash table using a first cryptographic process and performing a first permutation process to reorder the entries of the hash table to generate a first-processed hash table;
   communicating the first-processed hash table from the first electronic processing device to the second electronic processing device;
   using a second electronic processing device, encrypting the entries of the first-processed hash table using a second cryptographic process that is commutative with the first cryptographic process and performing a second permutation process that is commutative with the first permutation process to reorder the entries of the first-processed hash table to generate a first-and-second-processed hash table;
   communicating the first-and-second processed hash table from the second electronic processing device to the first electronic processing device; and
   using the first electronic processing device, decrypting the entries of the first-and-second processed hash table using the first cryptographic process and undoing the performing of the first permutation process to generate a double-blind hash table;
   using the second electronic processing device, generating a reordered hash table key value by hashing an index key value using a hash function associated with the hash table and performing the second permutation process on the hashed index key value;

communicating the reordered hash table key value from the second electronic processing device to the first electronic processing device;

using the first electronic processing device, retrieving the entry of the double-blind hash table that is indexed by the reordered hash table key value;

communicating the retrieved entry of the double-blind hash table from the first electronic processing device to the second electronic processing device; and using the second electronic processing device, decrypting the retrieved entry of the double-blind hash table using the second cryptographic process;

wherein the first electronic processing device does not have access to the second cryptographic process and does not have access to the second permutation process, and wherein the second electronic processing device does not have access to the hash table and does not have access to the double-blind hash table and does not have access to the first cryptographic process and does not have access to the first permutation process.

2. The method of claim 1, further comprising:
communicating the hash function associated with the hash table from the first electronic processing device to the second electronic processing device.

3. The method of claim 1, wherein the communicating of the retrieved entry and the decrypting of the retrieved entry comprises:
communicating only an encrypted index key portion of the retrieved entry of the double-blind hash table from the first electronic processing device to the second electronic processing device;
using the second electronic processing device, decrypting the encrypted index key portion using the second cryptographic process; and
conditional upon the decrypted index key portion matching the index key value, completing the communicating of the retrieved entry of the double-blind hash table from the first electronic processing device to the second electronic processing device.

4. The method of claim 1, wherein the communicating of the retrieved entry and the decrypting of the retrieved entry comprises:
using the second electronic processing device, encrypting the index key value using the second cryptographic process to generate an encrypted index key value;
communicating the encrypted index key value from the second electronic processing device to the first electronic processing device; and
conditional upon an encrypted index key portion of the retrieved entry of the second-processed hash table matching the encrypted index key value, communicating the retrieved entry of the second-processed hash table from the first electronic processing device to the second electronic processing device and using the second electronic processing device to decrypt the retrieved entry of the second-processed hash table using the second cryptographic process.

5. The method of claim 1, wherein the first permutation process changes the position of every entry of an input table and the second permutation process changes the position of every entry of an input table.

6. An apparatus comprising:
a first electronic processing device configured to perform a first cryptographic process and a first permutation process; and
a second electronic processing device configured to perform a second cryptographic process that is commutative with the first cryptographic process and a second permutation process that is commutative with the first permutation process;

wherein the first electronic processing device is not configured to perform the second cryptographic process and is not configured to perform the second permutation process;

wherein the second electronic processing device is not configured to perform the first cryptographic process and is not configured to perform the first permutation process; and wherein the first and second electronic processing devices are configured to cooperatively prepare a double-blind hash table from a hash table that is available at the first electronic device and is unavailable at the second electronic processing device, the preparation method comprising:
using the first electronic processing device to encrypt and reorder the entries of the hash table using the first cryptographic process and the first permutation process to generate a first-processed hash table,
using the second electronic processing device to encrypt and reorder the entries of the first-processed hash table using the second cryptographic process and the second permutation process to generate a first-and-second-processed hash table,
using the first electronic processing device to decrypt the entries of the first-and-second-processed hash table using the first cryptographic process and to undo the reordering performed by the first permutation process to generate the double-blind hash table, and
storing the double-blind hash table at the first electronic processing device, the double-blind hash table being unavailable at the second electronic processing device;

wherein the first and second electronic processing devices are further configured to cooperatively perform a double-blind hash table read method operating on the double-blind hash table stored at the first electronic processing device, the read method comprising:
using the second electronic processing device to hash an index key and permute the hashed index key by applying the second permutation process,
using the first electronic processing device to retrieve an item from the double-blind hash table using the hashed and permuted index key, and
using the second electronic processing device to decrypt the retrieved item using the second cryptographic process.

7. The apparatus of claim 6 wherein the hash table comprises a natural language translation memory wherein source language text segments of the translation memory define index keys of the hash table and target language text segments of the translation memory define values of the hash table that are indexed by the index keys.

8. The apparatus of claim 6 wherein the hash table comprises a natural language phrase table wherein source language phrases of the phrase table define index keys of the hash table and target language phrases and associated statistics of the phrase table define values of the hash table that are indexed by the index keys.

9. The apparatus of claim 6 wherein the hash table comprises an encyclopedia wherein search terms of the encyclopedia define index keys of the hash table and articles of the encyclopedia define values of the hash table that are indexed by the index keys.

10. The apparatus of claim 6, wherein the first permutation process changes the position of every entry of an input table and the second permutation process changes the position of every entry of an input table.

11. An apparatus comprising:
first and second electronic processing devices that mutually exclusively execute first and second commutative cryptographic processes respectively and first and second commutative permutation processes respectively, wherein the first electronic processing device has access to a hash table and the second electronic processing device does not have access to the hash table;
wherein the first and second electronic processing devices are configured to perform a method including:
encrypting and reordering the hash table using the first electronic processing device executing the first cryptographic process and the first permutation process;
communicating the encrypted and reordered hash table from the first electronic device to the second electronic processing device;
further encrypting and further reordering the hash table using the second electronic processing device executing the second cryptographic process and the second permutation process;
communicating the further encrypted and further reordered hash table from the second electronic processing device to the first electronic processing device;
partially decrypting and partially undoing the reordering of the further encrypted and further reordered hash table using the first electronic processing device executing the first cryptographic process and the first permutation process to generate a double-blind hash table that is encrypted using the second cryptographic process and re-ordered using the second permutation process and that is unavailable at the second electronic processing device;
using the second electronic processing device to hash an index key and permute the hashed index key by applying the second permutation process;
communicating the hashed and permuted index key from the second electronic processing device to the first electronic processing device;
using the first electronic processing device to retrieve an item from the double-blind hash table using the hashed and permuted index key;
communicating the retrieved item from the first electronic processing device to the second electronic processing device; and
using the second electronic processing device to decrypt the retrieved item using the second cryptographic process.

12. The apparatus of claim 11, wherein the first permutation process changes the position of every entry of an input table and the second permutation process changes the position of every entry of an input table.

13. The apparatus of claim 11 wherein the hash table comprises a natural language translation memory wherein source language text segments of the translation memory define index keys of the hash table and target language text segments of the translation memory define values of the hash table that are indexed by the index keys.

14. The apparatus of claim 11 wherein the hash table comprises a natural language phrase table wherein source language phrases of the phrase table define index keys of the hash table and target language phrases and associated statistics of the phrase table define values of the hash table that are indexed by the index keys.

15. The apparatus of claim 11 wherein the hash table comprises an encyclopedia wherein search terms of the encyclopedia define index keys of the hash table and articles of the encyclopedia define values of the hash table that are indexed by the index keys.

* * * * *